United States Patent [19]
Roehsler

[11] 3,855,133
[45] Dec. 17, 1974

[54] MULTI-LAYER FILTER MEMBRANE

[75] Inventor: Karl Gustav Roehsler, Goettingen-Nikolausberg, Germany

[73] Assignee: Sartorius-Membranfilter GmbH, Gottingen, Germany

[22] Filed: Dec. 20, 1972

[21] Appl. No.: 316,649

[30] Foreign Application Priority Data
Dec. 28, 1971 Germany............................ 2165073

[52] U.S. Cl............... 210/490, 210/491, 210/500, 264/41, 264/49
[51] Int. Cl............................................. B01d 25/16
[58] Field of Search ............ 210/23, 321, 489, 490, 210/491, 500

[56] References Cited
UNITED STATES PATENTS

| | | | |
|---|---|---|---|
| 3,556,305 | 1/1971 | Shorr................................. | 210/490 |
| 3,331,772 | 7/1967 | Brownscombe...................... | 210/23 |
| 3,709,841 | 1/1973 | Quentin............................. | 210/500 |
| 3,556,992 | 1/1971 | Massucco ........................... | 210/23 |
| 3,526,588 | 9/1970 | Michaels........................... | 210/500 |
| 3,445,321 | 5/1969 | Groves............................... | 210/500 |
| 3,644,202 | 2/1972 | Higley................................ | 210/23 |
| 3,648,845 | 3/1972 | Riley................................. | 210/500 |
| 3,737,045 | 6/1973 | Hashimoto et al.................. | 210/500 |
| 3,661,634 | 5/1972 | Riley................................. | 210/500 |
| 3,457,171 | 7/1969 | Flowers et al. .................... | 210/500 |

OTHER PUBLICATIONS

The Condensed Chemical Dictionary, 8th Ed., 5/71, p. 766, 767.

Primary Examiner—Frank A. Spear, Jr.
Assistant Examiner—Ferris H. Lander
Attorney, Agent, or Firm—Cushman, Darby & Cushman

[57] ABSTRACT

A multi-layer filter membrane for carrying out hyper-filtrations, each layer being allocated to a specific function which the membrane must fulfill. One of the layers is an osmotic skin provided by an unbroken film forming polymer and the membrane also includes a porous supporting base comprising a cellulosic material. The base is in the form of a gel film which is insoluble in water, and which is backed by an impregnated sponge layer.

35 Claims, No Drawings

MULTI-LAYER FILTER MEMBRANE

BACKGROUND OF THE INVENTION

Membranes for carrying out hyperfiltrations have very diversified applications, including for instance:
1. The recovery of water from saline solutions, e.g.,
   a. the desalination of sea water;
   b. the deminerlization of fresh water;
   c. the purification of industrial effluents; and
   d. the purification of rivers and waterways.
2. The recovery of small quantities of dissolved or colloidally dispersed substances from solutions containing the same, e.g.,
   a. the recovery of metals from industrial effluents;
   b. the concentration of hormones, vitamins, inoculants and vaccines, etc.
3. The concentrations of solutions or dispersions of available products that are thermally and/or chemically unstable or fugitive, e.g.,
   a. the concentration of fruit and vegetable juices;
   b. the concentration of sugar solutions;
   c. the preparation of beverage extracts (milk, coffee, tea, etc) and
   d. the concentration of sera.
4. The separation and purification of macromolecular or colloidal substances from solutions containing low molecular weight impurities, e.g.,
   a. the purification of blood;
   b. the use in artificial kidney machines;
   c. the separation of alkaloids, amino acids, glycosides, etc.

The particular construction of the proposed multi-layer filter membranes requires a special definition of the term of art "membrane" for the purposes of the present specification. The active layer proper of the contemplated multi-layer filter membrane is an unbroken closed film or foil and only the supporting base of this film or foil exhibits a pore or sponge structure such as that which would normally be understood to be within the meaning of the term "membrane."

As has already been said such multi-layer filter membranes are suitable for a large number of applications. One such application which is of particular interest is the desalination of sea water to provide drinking water. By reference to this special example the construction of the proposed multi-layer filter membrane and the manner in which it functions will be described in greater detail.

The desalinated water is obtained by forcing the sea water with the application of hydraulic pressure against the membrane. Owing to the differential rates of migration of ions in the sea water and the water molecules through the selectively permeable layer of the membrane the sea water is desalinated. The working head required for carrying out this process must exceed the osmotic pressure of the feed water. In the case of sea water, which may have a saline content of 3.5 percent by weight, the osmotic pressure is about 25 kp/sq.cm. This physical method is known as "hyperfiltration" or "reverse osmosis" (of, for instance, Ullmanns Encyclopaedie der technischen Chemie, 3rd edition, 1967, Vol. 18, pp 469 and 470).

The degree of desalination of the feed water and the flow rate of the desalinated water depend upon a number of different parameters. The degree of desalination (salt rejection) depends upon
1. the salt concentration in the feed water;
2. the physical construction of the membrane;
3. the chemical specificity of the high polymer used;
4. the velocity of flow of the feed water over the membrane surface; and
5. the working head applied.

The rate of flow of deslinated water depends upon
1. the thickness of the foil layer in the membrane;
2. the working head;
3. the temperature of the feed water;
4. the velocity of flow of the feed water over the surface of the membrane; and
5. the properties of the base supporting the membrane.

U.S. Pat. No. 3,122,132 already discloses desalination membranes which are formed by pouring a castable solution, and which are suitable for hyperfiltration. The production of the desalination membranes from a castable solution in one operation has a number of inherent drawbacks. All attempts at modification have been unsuccessful in improving the rejection efficiency (i.e., the degree of desalination) sufficiently (>99.5 percent) for a drinking water to be obtained from sea water in a single stage desalination process at an economical rate of product flow.

Desalination membranes are also known in the art (of Lonsdale, H. K., R. L. Rilay, C. E. Milstead, L. D. LaGrange, A. S. Douglas and S. B. Sachs "Research on Improved Reverse Osmosis Membranes", Final Report to Office of Saline Water, U.S. Department of the Interior, Contract 14-01-0001-1778, Gulf General Atomic Incorporated, April 1970) which are produced by pouring an inelastic layer of a high polymer on a finely porous membrane (0.1 $\mu$m mean pore diameter) which prior to being thus coated has been impregnated with an aqueous solution of polyacrylic acid to close the pores of the membrane.

The use as a base of a porous membrane having a mean pore diameter of 0.15 $\mu$m results in a considerable reduction in the rate of through flow since the proportion of pore area in the exposed filter area is only about 5 percent. Moreover, a pore diameter of 1500 A for a desalination layer that is about 400 A thick introduces a considerable unreliability factor into continuous operation.

OBJECTS OF THE INVENTION

It is therefore the object of the present invention to provide filter membranes suitable for hyperfiltration, which have an improved throughput rate, a satisfactory saline rejection efficiency and a better resistance to mechanical, chemical and biological attack then materials hitherto used for this purpose.

It will be appreciated from the above enumeration of parameters governing saline rejection and the rate of product flow that the demands made upon an efficient desalination membrane are of an extremely varied nature and that a single chemical compound cannot be expected optimally to satisfy every requirement even after having been subjected to a variey of treatment steps.

SUMMARY OF THE INVENTION

The subject matter of the present invention therefore consists in allocating different layers of a multi-layer foil to the several functions a desalination membrane must fulfill. Each of these layers belonging to different classes of chemical compounds may thus be optimized for its particular functional purpose and adapted to cooperate with the others.

Since even in a finely porous membrane (mean pore diameter 0.1 $\mu$m) the rate of product flow substantially depends upon the layer thickness, the use of very thin layers of the order of 0.05 to 0.1 $\mu$m is necessary for a foil having pore sizes which are in the desired Angstrom range, if economically acceptable rates of product flow are to be obtained.

Such thin layers cannot be handled individually without being destroyed. Large sheets cannot be technologically used. Consequently these thin layers must be supported by pouring them on a thick, stable base.

This base must satisfy a number of demands:

1. A layer thickness of about 150 $\mu$ would permit the filtered water to to flow out slowly and evenly,
2. it must stand up to the compaction experienced under a continuous working head of 100 to 150 kp/sq.cm;
3. its physical and chemical behaviour must not be changed by pressure, temperature and water; and
4. it must not itself have a desalinating effect.

The side of the supporting base facing the desalinating layer should have a very small pore size ($<$ 100 A) since otherwise the extremely thin desalination film would unavoidably break above larger sized pores when subjected to a working head as high as 100 kp/sq.cm.

Underneath this ultrafinely porous surface the supporting base must rapidly change to a more coarsely porous sponge structure to enable the filtered water to drain away easily.

The mechanical strength of the laminar walls of the sponge structure must be strengthened with the aid of filler materials to enable the latter to resist compaction under a continuous pressure head.

Experimental research has shown that it is useful to interpose another layer between the desalinating film and the supporting base, the purpose of this additional layer being to prevent the counterpressure underneath the desalinating film from dropping too far below the working head since otherwise hair cracks may form above areas in the surface containing coarser pores.

This interlayer which will be hereinafter referred to as the gel layer or film consists of a water-swellable though water-insoluble gel which functions because in the swollen state it provides a flexible reservoir between the rate of efflux of desalinated water from the desalinating film and the rate of discharge of water from the supporting base, the continuous presence of a certain volume of water permitting a constant head opposing the working head to be maintained.

In the proposed multiple layer filter membrane according to the invention comprising an osmotic skin of a film-forming polymer and a porous supporting base of a cellulose derivative containing filler particles:

a. the osmotic skin consists of at least one closed, unbroken film of a selectively permeable high polymer, and
b. the supporting base is composed of a film of gel which swells but does not dissolve in water, backed by a sponge layer which is impregnated on the side remote from the gel.

These multi-layer filter membranes according to the invention can be produced by a method comprising pouring castable solutions containing film-forming materials and thus forming films which are then treated with air and watered, the proposed method consisting in continuously pouring a castable solution containing 8 to 20 percent by weight of cellulose acetate having a 31.5 percent acetyl content, 2 to 7 percent by weight of filler materials, such as $TiO_2$, quartz, $Al_2O_3$, powdered pumice, bentonite, graphite, talc, glass fibres or pyrogenic highly disperse silica, 10 to 13 percent by weight of water and 60 to 80 percent by weight of a solvent consisting of acetonitrile, ethanol, acetone, ethyl lactate or ethyl glycol or a mixture of said solvents, from a stationary pourer having an elevationally adjustable weir, optionally on a fabric of glass fibres, fully synthetic fibres, graphite fibres or stainless metal fibres, on a moving endless receiving surface, and exposing the surface of the poured layer to air for 5 to 15 seconds before detaching the same from the receiving surface and immersing it in water for 5 to to 15 minutes, fixing the edges of the resultant supporting base and tempering the same for 1 to 10 minutes in a water bath at a temperature of 70° to 90°C, impregnating the back exhibiting the sponge structure of said supporting base at about 40° to 60°C for 1 to 5 minutes, followed by drying in air at 30° to 100°C for 1 to 5 minutes, and, after the prior application of any supplementary layers, finally coating the supporting base with at least one closed unbroken film of a selectively permeable inelastic, elastic or elastified high polymer.

For the production of the supporting base a cellulose acetate having the lowest possible acetyl content is selected in order to raise the capacity of this layer for absorbing water to a maximum. A cellulose acetate having an acetyl content of 31.5 percent has a water absorption capacity of 21 percent at 95 percent relative humidity and at a temperature of 25°C. For dissolving this low acetylated cellulose acetate in acetone an addition of — up to 20 percent — water is necessary.

In order to produce the sponge structure the cast supporting base must be immersed in a water bath after having been exposed to air for a short time. If the water bath is at room temperature the exothermic heat of mixture formation of the acetone with the water will raise the temperature in the supporting base before it has fully gelled and owing to the consequent rise in acetone vapour pressure a multitude of tiny gas bubbles will form which leave cavities when the gelling of the cellulose acetate is complete. These cavities cause uncontrolled flaws where the water permeability changes.

In order to prevent the formation of such gas bubbles several possibilities are available:

1. the water bath can be cooled to 0°C in order to reduce the exothermic reaction;
2. a solvent can be used which has an endothermic heat of mixture formation with water;
3. a solvent mixture can be used in which one of the solvents boils above 100°C and is capable of forming a binary or ternary azeotrope with one or two solvents.

The employment of water baths cooled to 0°C is not very convenient and causes extra expense.

The selection of solvents in which cellulose acetate dissolves very readily, and which at the same time generate heat when they mix with water, is very small. Suitable solvents for satisfying these conditions are formamide and acetonitrile.

The employment of ternary azeotropic mixtures is also possible, for instance
acetonitrile/ethanol/water—bp 72.9°C ethyl glycol/acetone/water—bp 97°C
ethyl acetate/ethanol/water—bp 92°C.

In order to improve the mechanical strength of the sponge structure the incorporation of fillers in the base is required. Preferred fillers are $TiO_2$, quartz powder, $Al_2O_3$, powdered pumice, bentonite, graphite, talc, glass fibres of a length between 0.2 and 0.5 mm and pyrogenic highly dispersed silica. According to the particle size of the fillers a content of filler material between 20 and 30 percent related to solids — should not be exceeded since otherwise a satisfactory cohesion of the high polymer in the layer ceases to be assured.

The addition of filler reduces the tendency to compact and the rate of percolation is improved.

For an economical optimisation of the foil membrane for large-scale industrial applications the provision of filter surfaces in the order of 1 square metre is necessary. In such large area filters having a thickness of only 150 μm the improvement in transverse strength achieved by the glass fibre addition is no longer sufficient. By reinforcing the base with a fabric its transverse strength can be considerably raised.

The fabric used must comply with the following demands:
1. its filaments or threads should not or should only insignificantly lengthen when exposed to water;
2. it must be stabilised against shrinkage up to 90°C;
3. there must be no change in mechanical strength after temporary contact with the organic solvents of the cast solution;
4. the gauge (diameter) of the monofils must be low;
5. the number of filaments per cm must be relatively small to maintain a sufficiently large screening surface.

Suitable materials are glass, fully synthetic (such as polyester), graphite and stainless metal fibre weaves.

The embedment of the fabric in the gel of the base must be such that by virtue of a special technique the fabric is wholly incorporated in the sponge layer since its presence in the gel would result in a considerable reduction in the rate of flow through the base.

The filler content must be raised (above 30 percent) sufficiently to prevent slight compaction from causing the fabric structure to break through into the desalination layer. Stretching of the desalination layer across the filaments of the weave might otherwise give rise to the appearance of hair cracks in the film.

The supporting base is so constructed that an approximately 130 μm sponge layer is located underneath an approximately 20 μm film of gel.

If the exposure time of the cast base to air is very short (5 to 15 seconds) a closed continuous film will not form on the side facing the air, instead of which only a gel and sponge structure will be formed, (cf. G. J. Gittens et al., Desalination 8 (1970), pages 369 to 391).

For ensuring that the exposure time to air is uniform a continuous production method is needed which enables the cast layer to dip into a water bath at the end of a defined period of exposure. To this end use is made of a stationary pourer having elevationally adjustable weir below which is an endless travelling receiving surface (in the form of a cylindrical drum or an endless metal band) and over which the poured solution flows at an even rate.

When casting on drums the short time of exposure to air (5 to 15 seconds) of the cast layer necessitates a limited period of residence on the receiving surface during which the drum surface dips into the water bath and at the end of which the cast film must have sufficiently gelled to enable it to be lifted off the receiving surface.

The minimum gelling time on the receiving surface depends
1. upon the material of the receiving surface;
2. upon the preliminary treatment of the receiving surface;
3. upon the thickness of the cast film;
4. upon the recipe of the casting solution, and
5. upon additives introduced into the casting solution.

For watering the supporting base which is 100 to 150 μm thick 5 to 15 minutes, preferably 10 minutes, are sufficient for terminating gelling by the exchange of organic solvent and water by diffusion.

It is a well known fact that the rate of flow through "membranes" used for reverse osmosis can be increased by raising the temperature of the feed water. The temperature effect is about 4.5 percent/°C.

Since the membrane is intended to be used at feed water temperatures up to 90°C to take advantage of the temperature effect for raising absorption capacity, the supporting base must be tempered for the purpose of beforehand giving effect to any structural changes and shrinkage processes that may occur.

Tempering for 1 to 10 minutes, preferably for about 5 minutes, in a water bath at between 70° and 90°C, preferably 80°C, causes a surface shrinkage of about 28 percent. Since the supporting base is restrained in the direction of travel, shrinkage is confined to the transverse direction. In order to prevent the creation of an anisotropic state in the supporting base every edge is gripped and held during all further procedural steps after it has been removed from the surface on which it was cast.

If the supporting base were dried without prior treatment irreversible structural changes would occur, probably due to partial adhesions in the sponge structure. Any such structural change considerably diminishes the rate of flow through the base. It has been found that an impregnation of the supporting base reliably prevents a reduction in the percolation rate after drying. Suitable impregnant solutions are mixtures of polyvinyl methyl ether or polyacrylic acid and glycerine, wetting agents, methanol and water, and for some filler combinations such as graphite/$TiO_2$, an impregnation with a 75 percent aqueous solution of glycerine is sufficient.

Impregnation is carried out at a temperature of about 40° to 60°, preferably 50°C, for 1 to 5 minutes, preferably 3 minutes. It is important that only that side of the base is impregnated which exhibits the sponge structure. The other side, i.e. the gel film, must be kept free from water-soluble substances for the subsequent application of the desalination film.

The following drying of the supporting base may be effected in air at a temperature between 30° and 100°C, preferably between 50° and 60°C. The impregnated side, viz. the gel, must be dried sufficiently to enable its surface to be later satisfactorily wetted with water-immiscible organic solvents.

The required state of dryness will have been attained with an aqueous glycerine solution in 1 to 5 minutes, preferably 3 minutes.

The edges of the supporting base are kept fixed during the process of drying.

With a view to even further improving the water absorption capacity of the base the cellulose acetate membrane may be subjected to alkaline hydrolysis so that finally a hydrated cellulose membrane will be obtained.

At 95 percent relative humidity and at 25°C cellulose hydrate has an absorption capacity for water of 90 percent.

For the production of the cellulose hydrate membrane the fully gelled watered cellulose acetate base is hydrolysed for 1 to 10 minutes, preferably 5 minutes, with an alcoholic KOH. A useful hydrolysing solution is for instance one consisting of
  4 percent by weight of KOH,
  48 percent by weight of ethanol and
  48 percent by weight of water.

When the KOH has been washed out the base layer is impregnated and dried immediately, without being first tempered. For a base of cellulose hydrate the above-mentioned filler materials are suitable. For improving transverse strength an addition of 5 percent by weight of glass fibres (length of fibres 0.3 to 0.5 mm) — related to solid material is advantageous.

After the optional prior application of supplementary layers the desalination film proper is applied, i.e., the continuous closed film or films of a selectively permeable inelastic, elastic or elastified high polymer or polymers.

The effectiveness of the desalination layer is independent of its thickness. However, the thickness of the layer has a very marked effect on the rate of flow through the layer. Theoretically a monomolecular desalination film would be sufficient. However, in practice a macroscopic layer which is between 0.05 and 0.1 $\mu$m thick is necessary to ensure the absence of faults.

Three possible ways of producing and respectively applying, the desalination layer are thus available:
1. The application and bonding of an inelastic high polymer film to a supporting base by the formation of secondary valence bonds;
2. The application of an elastic or elastified high polymer film without a special bonding to the supporting base, and
3. The application and bonding of an elastic or elastified high polymer film to a supporting base by the formation of secondary or primary valence bonds.

Inelastic high polymers which are suitable for performing the invention include phenoxy resins, polyvinyl chloride, polyvinyl fluoride, polysulphones, cellulose acetate, polyacrylates or polyamides, whereas suitable elastic high polymers are silicone rubber, natural rubber or synthetic rubbers, such as butadiene/acrylonitrile rubbers. For the purpose of elastifying inelastic thin brittle high polymer films plasticisers in the conventional meaning of the term cannot be used. These liquid plasticising momomers which merely act as lubricants between the fibre molecules would be flushed out in course of time by the percolating water during pressure filtration. Appropriate elastifying agents are therefore rubber-elastic substances such as polyurethanes, a few plasticising polymers, silicone rubbers, natural rubbers and synthetic rubbers. However, the rubber elastic properties of these substances must not be substantially modified by the action of water and temperature (up to 90°C) and by the alkalinity of the feed water (sea water:- pH 8 to 9) when in continuous service. Moreover, in mixture they must be compatible with the high polymers that are to be elastified and as a pure substance they should per se have no significant desalinating effect.

The best solution of the desalination problem is a desalination layer composed only of an elastomer. The desalinating effect of elastic high polymers does not approach that of the high polymers which range from the inelastic to the brittle, such as cellulose triacetate, polyvinyl chloride, polyvinyl fluoride, polyacrylates, polysulphones, phenoxy resins and polyamides.

The blending of a brittle highly effective desalinating polymer with an elastomer of lower desalinating efficiency is merely a precaution against the formation of hair cracks in the desalination film during continuous service.

For the desalination of brackish water, the purification of industrial effluents or the demineralisation of tap water it is nevertheless possible to make use of fully elastic desalination films of silicone rubber or cold vulcanised natural rubber. The low content in ppm of mineral substances in the feed water allows a lower desalination efficiency to reduce the ppm mineral content of the demineralised water to a sufficiently low level.

The omission of a bond between the very thin desalination film (0.05 to 0.1 $\mu$m) and the supporting base will always introduce an element of uncertainty in the service life of such a membrane. On the other hand, this disadvantage is more than offset by special advantages.

The supporting base of cellulose acetate that has so far been discussed consists of two merging layers, namely
1. the gel film,
2. the sponge layer.

However, it is also possible to provide a cellulose acetate supporting base consisting exclusively of a sponge layer and to superimpose a gel film consisting of a chemically different high polymer.

The advantage of this is that the properties of the cellulose acetate gel film produced in one operation with the sponge layer need not be considered and that instead a gel film optimally adapted to the intended purpose can be specially applied in a separate procedural step. The drawback of the resultant structure of the foil membrane is that the passage of water causes the desalination film to be detached from the gel film and the gel film from the backing layer. The three layers can then be kept together only by the clamping effect of the seal at the edge.

The advantage of a gel film which is optimally adjusted to a particular application is its higher absorptive activity due to its greater swelling power and hence a high rate of flow through the membrane.

The production of a supporting base consisting only of a sponge structure calls for a modification of technique. (Cf. W. Banks and A. Sharples, J. appl. Chem., vol. 16, March, page 95).

After having been spread the solution forming the supporting base is immediately plunged into the water bath without prior residence in air. This prevents the layer from developing an asymmetrical structure and the filtering properties of the resultant base will be the same on both sides. A base thus produced is then impregnated on one side, dried and coated for instance with a gel substance consisting of an agar-agar/formaldehyde reaction product, a gelatine/formaldehyde reaction product or alginic acid. Finally the elastic or elastified desalination film is applied.

The elastic or elastified desalination layers may be bonded by taking suitable steps, by primary valence bonds, to the supporting base.

Cellulose acetate having an acetyl content of 31.5 percent contains a sufficient number of free OH-groups to form primary valence bonds when coated with polyisocyanates. During the following provision of a layer of natural or synthetic rubber or blends of rubbers and other high polymers firm bonds between the supporting base and the desalination layer which are stable when water passes through during pressure filtration can be produced by the development of urethane groups.

Both the diluent for the polyisocyanate and the solvents for the subsequent coating with rubber or blend of high polymers must not contain water, alcohols and amines.

Firmly anchored desalination layers greatly improve reliability in service.

When making a selection of inelastic, elastic or elastified high polymers for the production of the closed continuous selectively permeable films care should be taken to ensure that the coefficients of linear thermal expansion of the high polymers used in the supporting base and in the desalination layers are as nearly as possible equal.

If this requirement were disregarded the difference between the temperature of manufacture of the foil membrane and the temperature of the feed water that is to be filtered would generate more or less pronounced shearing stresses between the contacting layers which could cause the development of hair cracks.

The coefficients of linear thermal expansion of some high polymers are listed hereunder:

| Cellulose acetate | $8 \cdot 10^{-5}$ | [degrees$^{-1}$] |
|---|---|---|
| Polysulphone | $5.6 \cdot 10^{-5}$ | do. |
| Phenoxy resin | $6 \cdot 10^{-5}$ | do. |
| Elvamide 8061 (DuPont) (a modified polyamide soluble in ethanol/water) | $8 \cdot 10^{-5}$ | do. |
| Polyphenylene oxide | $5 \cdot 10^{-5}$ | do. |
| Nylon 6.6 | $7 \cdot 10^{-5}$ | do. |

The high polymers used for the desalination film should not have a secondary glass transition temperature within the temperature range of the feed water because this would usually cause a major structural change in the polymer film, depriving it of its desalinating power.

The following examples illustrate the invention without in any way limiting its scope.

EXAMPLE 1

For the production of the supporting base a castable solution of the following composition was used:

| Cellulose acetate having a 31.5% acetyl content GU 1000 (Bayer) | 16% | by weight |
|---|---|---|
| TiO$_2$ | 2% | do. |
| talc | 2% | do. |
| acetonitrile | 35% | do. |
| ethanol | 35% | do. |
| water | 10% | do. |
| viscosity:[1] 24.8 secs. | | |

[1]) Viscosity was always measured as the "falling sphere viscosity", since density measurements of the highly viscous solutions would have been too complicated.
Instrument used: Hoppler viscometer.
Falling distance: 100 mm.
Tube diameter: 15.944 mm.
Weight of steel sphere: 5.533 grammes.
Diameter of steel sphere: 11.10 mm.
Test temperature: 30°C.

The casting solution was poured continuously from a stationary pourer over a weir of adjustable height on a moving endless receiving surface (in the form of a cylindrical drum or an endless metal band) and then immersed in a water bath after a brief residence time of 5 to 15 seconds. After having been watered for 10 minutes the foil membrane was tempered in a water bath at 80°C for 5 minutes, the edges being held to prevent shrinkage. The resultant supporting base was then impregnated for 3 minutes at 50°C on that side which exhibited the sponge structure, with an impregnant of the following composition:

| Polyvinyl methyl ether | 5% | by weight |
|---|---|---|
| glycerine | 29% | do. |
| Agepon (a wetting agent, BAYER) | 1% | do. |
| methanol | 35% | do. |
| water | 30% | do. |

The supporting base was then dried in air at 50°C to 60°C for 3 minutes, the edges on each side being gripped and thus fixed.

As will be described below this base was then coated with one or more continuous closed films of a selectively permeable inelastic, elastic or elastified high polymer.

EXAMPLE 2

The procedure in this Example was the same as that described in Example 1, excepting that a casting solution of the following composition was used:

| Cellulose acetate GU 1000 (BAYER) | 16% | by weight |
|---|---|---|
| bentonite | 4% | do. |
| ethyl glycol | 35% | do. |
| acetone | 35% | do. |
| water | 10% | do. |
| Viscosity: 64.5 secs. | | |

EXAMPLE 3

The procedure in this Example was the same as that described in Example 1, excepting that a casting solution of the following composition was used:

| Cellulose acetate GU 1000 (BAYER) | 8.5% | by weight |
|---|---|---|
| SiO$_2$ | 1 % | do. |
| TiO$_2$ | 1 % | do. |
| glass fibres | 0.5% | do. |
| ethyl lactate | 56 % | do. |
| ethanol | 22 % | do. |
| water | 11 % | do. |
| Viscosity: 6.3 secs. | | |

EXAMPLE 4

The procedure in this Example was the same as that described in Example 1, but the following casting solution was used:

| Cellulose acetate GU 1000 (BAYER) | 16% | by weight |
|---|---|---|
| powdered pumice | 4% | do. |
| dioxane | 40% | do. |

-Continued

| | | |
|---|---|---|
| acetone | 30% | do. |
| water | 10% | do. |

Viscosity: 29.3 secs.

EXAMPLE 5

The procedure in this Example was the same as that described in Example 1, but a casting solution of the following composition was used:

| | | |
|---|---|---|
| Cellulose acetate GU 1000 (BAYER) | 13% | by weight |
| talc | 3% | do. |
| TiO$_2$ | 3% | do. |
| glass fibres | 1% | do. |
| ethyl glycol | 35% | do. |
| acetone | 35% | do. |
| water | 10% | do. |

Viscosity: 19.5 secs.

EXAMPLE 6

The procedure in this Example was the same as that described in Example 1, but the composition of the impregnant was as follows:

| | | |
|---|---|---|
| Polyacrylic acid | 2.5% | by weight |
| glycerine | 30.0% | do. |
| Agepon (wetting agent, BAYER) | 1.0% | do. |
| methanol | 40.0% | do. |
| water | 26.5% | do. |

In the case of some filler combinations, such as graphite/TiO$_2$, impregnation with a 75 percent aqueous glycerine solution is already sufficient.

Impregnation was performed at about 40° to 60°C for 1 to 5 minutes. It is important that impregnation should be confined to only that side of the supporting base which has the sponge structure. The other side, i.e. the gel film, must be kept free from water-soluble constituents in view of the subsequent application of the desalination film.

EXAMPLE 7

This Example illustrates the production of an inelastic desalination film bound to the supporting base by secondary valence bonds.

For the purpose of producing this layer ethyl acetate (or methyl isobutyl ketone) was poured over the gel side of the impregnated dried base (obtained as described in the preceding Examples) for the purpose of flushing off particles of dust and at the same time of making this surface slightly swell.

This was followed by drying which takes 1 minute in the case of ethyl acetate and 2 to 3 minutes in the case of methyl isobutyl ketone.

A film of cellulose triacetate having a water absorption capacity of 10 percent was then poured on the still slightly swollen cellulose acetate base which had a water absorption capacity of 21 percent. The composition of the cellulose triacetate was as follows:

| | | |
|---|---|---|
| Cellulose triacetate T 1000 (BAYER) | 0.5% | by weight |
| methyl acetate | 44.5% | do. |
| methylene chloride | 45.0% | do. |
| methanol | 5.0% | do. |
| cyclohexanone | 5.0% | do. |

After the cellulose triacetate film had dried a polyamide which was soluble in a mixture of water and alcohol and which had an absorption capacity for water of 2.4 percent was applied in the form of a very thin film, the composition of this solution of polyamide being the following:

| | | |
|---|---|---|
| Amilan X 8000 (a modified polyamide which is soluble in ethanol/water, made by TOYO RAYON/Japan) | 0.5% | by weight |
| ethanol | 66.5% | do. |
| water | 33.0% | do. |

Not before the polyamide film is dry should the desalination film proper by applied. For this purpose an 0.5 percent by weight solution of a phenoxy resin (PKHH Brenntag) in ethyl glycol acetate was used.

The high polymer of the desalination film proper (in this instance the phenoxy resin) must be dissolved in a non-aqueous solvent. Pouring should preferably proceed at 0 percent relative humidity.

EXAMPLE 8

The production of a supporting base of hydrated cellulose is accomplished by hydrolysing a cellulose acetate layer (obtained for instance as described in Example 1) with a hydrolysing solution consisting of:

4 percent by weight of KOH
48 percent by weight of ethanol
48 percent by weight of water, for 5 minutes at room temperature. After the KOH had been washed out impregnation and drying was done immediately, without prior tempering.

In order to bind this supporting base to the desalination layer by primary valence bonds the hydrophilic tendency of the hydrated cellulose must be largely suppressed on the side that is to be coated. For this purpose the gel-covered side of the impregnated and dried supporting base of hydrated cellulose was coated with a 1 percent by weight solution of triphenyl-methane-4,4',4''-triisocyanate (Desmodur R/BAYER) in methylene chloride and submitted to a warm air treatment at 50°C for 2 minutes. When provided with a film of Desmodur R the base must not have been previously treated with ethyl acetate or methyl isobutyl ketone.

The desalination film was applied as described in Example 7.

EXAMPLE 9

The supporting base produced by pouring an appropriate solution (such as that described in Examples 1 to 5) was immediately submerged in the water bath without allowing any time for exposure to air. This avoids the formation of an asymmetrical structure of the supporting base so that the resultant filtering properties of the base is the same on both sides.

A supporting base thus produced is impregnated on one side, dried and coated with a gel substance of the following composition:

| | | |
|---|---|---|
| Agar—agar, (3.0% aqueous solution) | 35% | by weight |
| formaldehyde (35%) | 5% | do. |

After the gel film had been dried for 2 minutes in warm air at 50°C the elastic or elastified desalination film was applied.

The following mixture was used for this application:

| Natural rubber | 0.25% | by weight |
| --- | --- | --- |
| petrol | 50 % | do. |
| carbon disulphide | 49.75% | do. |

The resultant membrane was dried at room temperature.

EXAMPLE 10

The procedure described in Example 9 was repeated excepting that the elastic desalination film was produced from an 0.5 percent by weight solution of:

a butadiene/acrylonitrile rubber compound in ethyl glycol acetate. Drying was again effected at room temperature.

EXAMPLE 11

Example 9 was repeated again, excepting that now the following composition was used for the application of the elastic desalination film:

| Silicone rubber, casting compound 56 (WACKER) | 20% | by weight |
| --- | --- | --- |
| hardener T 11 (WACKER) | 2% | do. |
| silicone oil AK35 | 18% | do. |
| toluene | 60% | do. |

Drying in this case was for 1 hour at 60°C.

EXAMPLE 12

For the production of an elastic desalination film bound to the supporting base by primary valence bonds a supporting base of cellulose acetate, obtained as described in Examples 1 to 5, was first dried for a few minutes with hot air at 100°C. A layer was then applied from a 1 percent by weight solution of triphenylmethane-4,4',4''-triisocyanate in methylene chloride. Finally a film was applied to the polyisocyanate layer from an 0.5 percent by weight solution of natural rubber in petrol or an 0.5 percent by weight solution of a butadiene/acrylonitrile rubber compound (Ultramoll 3620 BAYER) in methylene chloride, and the development of urethane groups in the base and in the desalination layer was initiated by a treatment with hot air at 80° to 110°C.

EXAMPLE 13

Example 12 was repeated excepting that the following composition was used for an elastified desalination film:

| Butadiene/acrylonitrile rubber compound | 0.25% | by weight |
| --- | --- | --- |
| phenoxy resin (PKHH Brenntag) | 0.25% | do. |
| ethyl glycol acetate | 99.50% | do. |

Drying was carried out at 50°C.

I claim:

1. A multiple layer filter membrane comprising:
   a. an osmotic skin composed of at least one closed continuous film about 0.05 to about 0.1 $\mu m$ thick of a selectively permeable high polymer selected from the group consisting of an inelastic selectively permeable high polymer, an elastic selectively permeable high polymer and an elastified selectively permeable high polymer; and
   b. a porous base containing finely divided filler material therein, the base composed of a gel film which swells in contact with and is insoluble in water, the gel layer backed by a relatively thicker cellulose acetate sponge layer impregnated on the side remote from both the gel layer and osmotic skin (a) having a pore size which increases continuously from the gel through out the sponge layer to the back thereof.

2. A membrane according to claim 1 wherein the selectively permeable high polymer has a co-efficient of linear thermal expansion between 5 and 8 · $10^{-5}$ (degrees$^{-1}$).

3. A membrane according to claim 1 wherein the continuous film is bound by secondary valence bonds.

4. A membrane according to claim 1 wherein the continuous film is bound by primary valence bonds.

5. A membrane according to claim 1 wherein the inelastic selectivity permeable high polymer is selected from the group consisting of a phenoxy resin, polyvinyl chloride, polyvinyl fluoride, a polysulphone, cellulose triacetate, a polyacrylate and a polyamide.

6. A membrane according to claim 1 wherein the elastic selectively permeable high polymer is selected from the group consisting of natural rubber, silicone rubber and synthetic rubber.

7. A membrane according to claim 6 wherein the continuous film rests on a gel layer consisting of a material selected from the group consisting of alginic acid, an agar-agar/formaldehyde reaction product, and a gelatine/formaldehyde reaction product and the supporting base consists exclusively of a sponge layer comprising cellulose acetate having a 31.5 percent acetyl content and filler materials.

8. A membrane according to claim 6 wherein the continuous film rests on a gel layer consisting of a material selected from the group consisting of alginic acid, an agar-agar/formaldehyde reaction product, and a gelatine/formaldehyde reaction product, the supporting base consists exclusively of a sponge layer comprising cellulose acetate having a 31.5 percent acetyl content and filler materials and the sponge layer is reinforced with a fabric of a material selected from the group consisting of glass, fully synthetic fibres, graphite fibres and stainless metal fibres.

9. A membrane according to claim 1 wherein the elastified selectively permeable high polymer is composed of inelastic high polymer blended with a material selected from the group consisting of polyurethane, polymeric plasticizer, silicone rubber, natural rubber and synthetic rubber to elastify same.

10. A membrane according to claim 1 wherein at least one supplementary layer is provided between the continuous film and the supporting base.

11. A membrane according to claim 10 wherein the supplementary layer consists of a reaction product of formaldehyde with a material selected from the group consisting of gelatine and agar-agar.

12. A membrane according to claim 10 wherein the supplementary layer is a material selected from the group consisting of alginic acid, cellulose triacetate and a polyamide soluble in alcohol.

13. A membrane according to claim 1 wherein the supporting base consists of a gel film about 20 $\mu m$ thick having a pore size below 100 A backed by a sponge layer of cellulose acetate about 130 $\mu m$ thick and having a pore size of about 2500 to 4000 A which increases continuously from the gel through the sponge layer to the back.

14. A membrane according to claim 16 wherein the cellulose acetate has an acetyl content of 31.5 percent.

15. A membrane according to claim 1 wherein the finely-divided filler material of the supporting base is a material selected from the group consisting of $TiO_2$, quartz, $Al_2O_3$, powdered pumice, bentonite, graphite, talc, glass fibres and pyrogenic highly disperse silica.

16. A membrane according to claim 1 wherein the supporting base is reinforced by the incorporation of a fabric of a material selected from the group consisting of glass, fully synthetic fibres, graphite fibres and stainless metal fibres.

17. A membrane according to claim 1 wherein the back of the supporting base having the sponge structure is impregnated with a material selected from the group consisting of glycerine, polyvinyl methyl ether and polyacrylic acid.

18. A membrane according to claim 1 wherein the continuous film rests on a supplementary layer consisting of an alcohol-soluble polyamide having a water absorption capacity of 2.4 percent, backed by a supplementary layer of cellulose triacetate underneath which is the supporting base of cellulose acetate.

19. A membrane according to claim 1 wherein the continuous film consists of an elastic selectively permeable high polymer, and rests on a supplementary layer consisting of an alcohol-soluble polyamide having a water absorption capacity of 2.4 percent, backed by a supplementary layer of cellulose triacetate underneath which is the supporting base, the supporting base consisting of hydrated cellulose, and a layer of polyisocyamate bound by polyaddition being interposed between the continuous film and the supporting base.

20. A membrane according to claim 19 wherein the polyisocyanate layer consists of triphenylmethane-4, 4′, 4″-triisocyanate.

21. A membrane according to claim 1 wherein a layer of polyioscyanate bound by polyaddition is interposed between the continuous elastified selectively permeable high polymer film and the support base.

22. A membrane according to claim 1 wherein a layer of triphenylmethane-4, 4′, 4″-triisocyanate bound by polyaddition is interposed between the continuous elastified selectively permeable high polymer film and the support base.

23. A membrane according to claim 1 wherein the porous supporting base is about 100 to about 150 μm in thickness.

24. A membrane according to claim 1 wherein said filler material is present in the supporting base to the extent of about 20 to about 30 percent of the solids present in the layer.

25. A method of producing a multiple layer membrane comprising the steps of
a. pouring a castable solution containing 8 to 20 percent by weight of cellulose acetate having a 31.5 percent acetyl content, 2 to 7 percent by weight of filler material selected from the group consisting of $TiO_2$, quartz, $Al_2O_3$, powdered pumice, bentonite, graphite, talc, glass fibres and pyrogenic highly disperse silica, 10 to 13 percent by weight of water and 60 to 80 percent by weight of a solvent selected from the group consisting of acetonitrile, ethanol, acetone, ethyl lactate, ethyl glycol and a mixture of said solvents, from a stationary pourer having an elevationally adjustable weir, onto a moving endless receiving surface to form a film;
b. exposing the surface of the poured film to air for from 5 to 15 seconds;
c. immersing the film in water for 5 to 15 minutes;
d. fixing the edges of the resultant supporting base;
e. tempering the base for 1 to 10 minutes in water bath at a temperature of 70° to 90°C;
f. impregnating the back exhibiting the sponge structures of said supporting base at 40° to 60°C for 1 to 5 minutes;
g. drying in air at 30° to 100°C for 1 to 5 minutes, and
h. after the prior application of any supplementary layers, coating the supporting base with at least one closed unbroken film of a selectively permeable high polymer.

26. A method according to claim 25 wherein the watered supporting base of cellulose acetate is hydrolysed and thus converted to a supporting base of hydrated cellulose by treating the same with an alcoholic KOH at room temperature for 1 to 10 minutes.

27. A method according to claim 26 wherein a solvent selected from the group consisting of ethyl acetate and methyl isobutyl ketone is poured over the gel side of the impregnated and dried supporting base, the resultant film being dried for 1 to 3 minutes, a second very thin film of cellulose triacetate is then applied to the dried film and a very thin third film of a polyamide soluble in a water and alcohol mixture and having an absorption capacity for water of 2.4 percent is applied to the second film and also dried, and a phenoxy resin in the form of an 0.5 percent by weight solution in ethyl glycol acetate is applied in film form and dried.

28. A method according to claim 26 wherein a solvent selected from the group consisting of ethyl acetate and methyl isobutyl ketone is poured over the gel side of the impregnated and dried supporting base, the resultant film being dried for 1 to 3 minutes, a second very thin film of cellulose triacetate is then applied to the dried film and a very thin third film of a polyamide soluble in a water and alcohol mixture and having an absorption capacity for water of 2.4 percent is applied to the second film and also dried, a phenoxy resin in the form of an 0.5 percent by weight solution in ethyl glycol acetate is applied in film form and dried, the high polymer forming the desalination layer proper is dissolved in a non-aqueous solvent, and the process of pouring is performed when relative humidity is negligibly low.

29. A method according to claim 26 wherein the impregnated and dried supporting base of cellulose hydrate is provided on its gel side with a coating of a 1 percent by weight solution of triphenylmethane-4, 4′, 4″-triisocyanate in methylene chloride and submitted to a warm air treatment at 50°C for 2 minutes, and an inelastic layer of a phenoxy resin is then formed from an 0.5 percent by weight solution of the phenoxy resin in ethyl glycol acetate and the resultant membrane dried.

30. A method according to claim 26 wherein a solvent selected from the group consisting of ethyl acetate and methylisobutyl ketone is poured over the gel side of the impregnated and dried supporting base, the resultant film being dried for 1 to 3 minutes, a second very thin film of cellulose triacetate is then applied to the dried film and a very thin third film of a polyamide soluble in a water and alcohol mixture and having an absorption capacity for water of 2.4 percent is applied to the second film and also dried, a phenoxy resin in the form of an 0.5 percent by weight solution in ethyl glycol acetate is applied in film form and dried, the solution for forming the supporting base, having been poured, is at once immersed in water without a residence time in air, the resultant supporting base is impregnated on one side, dried and coated with a gel substance consisting of an agar-agar/formaldehyde reaction product, and, when the gel has been dried in warm air at 50°C for 2 minutes an elastic layer of a material selected from the group consisting of natural rubber, butadiene/acrylonitrile rubber and silicone rubber is applied and the resultant layer dried at a temperature between room temperature and 60°C.

31. A method according to claim 26 wherein a solvent selected from the group consisting of ethyl acetate and methyl isobutyl ketone is poured over the gel side of the impregnated and dried supporting base, the resultant film being dried for 1 to 3 minutes, a second very thin film of cellulose triacetate is then applied to the dried film and a very thin third film of a polyamide soluble in a water and alcohol mixture and having an absorption capacity for water of 2.4 percent is applied to the second film and also dried, a phenoxy resin in the form of an 0.5 percent by weight solution in ethyl glycol acetate is applied in film form and dried, the high polymer forming the desalination layer proper is dissolved in a non-aqueous solvent, the process of pouring is performed when relative humidity is negligibly low, the solution for forming the supporting base, having been poured, is at once immersed in water without a residence time in air, the resultant supporting base is impregnated on one side, dried and coated with a gel substance consisting of an agar-agar/formaldehyde reaction product, and, when the gel has been dried in warm air at 50°C for 2 minutes an elastic layer of a material selected from the group consisting of natural rubber, butadiene/acrylonitrile rubber and silicone rubber is applied and the resultant layer dried at a temperature between room temperature and 60°C.

32. A method according to claim 25 wherein the impregnated layer forming the supporting base is dried for a few minutes with hot air at 100°C, the dried layer is then coated with a 1 percent by weight solution of triphenylmethane-4, 4', 4''-triisocyanate in methylene chloride and an 0.5 percent by weight solution of natural rubber in petrol is applied and the coated membrane is dried with hot air at a temperature between 80° and 110°C.

33. A method according to claim 25 wherein the impregnated layer forming the supporting base is dried for a few minutes with hot air at 100°C, the dried layer is then coated with a 1 percent by weight solution of triphenylmethane-4, 4', 4''-triisocyanate in methylene chloride and an 0.5 percent by weight solution of a butadiene/acrylonitrile rubber in methyle chloride is applied and the coated membrane is dried with hot air at a temperature between 80° and 110°C.

34. A method according to claim 25 wherein the impregnated layer forming the supporting base is dried for a few minutes with hot air at 100°C, the dried layer is then coated with a composition having the following formulation:

| | |
|---|---|
| butadiene/acrylonitrile rubber | 0.25% by weight |
| phenoxy resin (PKHH Brenntag) | 0.25% by weight |
| ethyl glycol acetate | 99.50% by weight | and the coated membrane is dried with hot air at a temperature of 50°C.

35. A multilayer filter membrane suitable for use in reverse osmosis, hyperfiltrations and other such separation processes, said membrane comprising:
  a. an osmotic skin composed of at least one closed, continuous film about 0.05 to about 0.1 µm thick of an inelastic, elastic or elastified selectively permeable high polymer; and
  b. a porous base layer containing about 20 to about 30 percent, calculated on the solids content, of a finely divided filler material therein, the base composed of a gel film which swells in contact with and is insoluble in water and backed by a relatively thicker cellulose acetate sponge layer about 100 to about 150 µm in thickness having a pore size of about 2500 to 4000 A increasing continuously from the gel through the sponge layer to the back and impregnated on the side remote from both the gel layer and osmotic skin (a).

* * * * *